United States Patent [19]

Hunter

[11] Patent Number: 4,625,426
[45] Date of Patent: Dec. 2, 1986

[54] DYNAMIC ALIGNMENT FIXTURE WITH FEEDBACK CONTROL

[75] Inventor: Joe S. Hunter, Huntsville, Ala.

[73] Assignee: The United States of America as represented by the Secretary of the Army, Washington, D.C.

[21] Appl. No.: 820,035

[22] Filed: Jan. 21, 1986

[51] Int. Cl.⁴ .................. G01B 3/56; G01B 5/24
[52] U.S. Cl. .................................. 33/537; 73/1 D
[58] Field of Search .......... 33/1 N, 536, 537, 538, 33/568; 73/1 D, 1 DC, 1 E; 269/60

[56] References Cited

U.S. PATENT DOCUMENTS

| | | | |
|---|---|---|---|
| 2,397,300 | 3/1946 | Tilton | 33/536 |
| 2,771,821 | 11/1956 | Beusch | 33/536 |
| 3,015,946 | 1/1962 | Moore | 73/1 D |
| 3,164,978 | 1/1965 | Sharman et al. | 73/1 E |
| 3,195,238 | 7/1965 | Grenell | 33/536 |
| 3,788,633 | 1/1974 | Cho | 33/536 |
| 4,238,888 | 12/1980 | Goldsmith | 33/536 |
| 4,547,974 | 10/1985 | Hester et al. | 33/537 |

FOREIGN PATENT DOCUMENTS

| | | | |
|---|---|---|---|
| 1473895 | 12/1968 | Fed. Rep. of Germany | 73/1 E |
| 783585 | 11/1980 | U.S.S.R. | 73/1 D |

Primary Examiner—Richard R. Stearns
Attorney, Agent, or Firm—Harold W. Hilton; Freddie M. Bush; John C. Garvin, Jr.

[57] ABSTRACT

A closed loop dynamic alignment fixture which has a pivot plate which is adapted to have a rate gyro mounted thereon and a base which is adapted to be mounted on a rate table with means for automatically adjusting the pivot plate relative to the base plate and rate table to allow for the testing of the amount of misalignment of an input axis of the rate gyro that is mounted thereon to allow misalignment data to be gathered on high drift rate gyros.

4 Claims, 6 Drawing Figures

DYNAMIC ALIGNMENT FIXTURE WITH FEEDBACK CONTROL

DEDICATORY CLAUSE

The invention described herein may be manufactured, used, and licensed by or for the Government for governmental purposes without the payment to me of any royalties thereon.

BACKGROUND OF THE INVENTION

The procedure in the past for measuring the alignment of an input axis of a gyro has been to position shims or gauge blocks under one side or edge of the gyro instrument case and determine if the output approaches null as the instrument is rotated about a vertical axis. Since the previous method of determining input axis misalignment is a "cut & try" method, the rate table on which the gyro is mounted must be stopped many times in order to add or subtract shims or gauge blocks to null the gyro output. The previous approach is only valid for low drift rate gyros, since the time required to determine the alignment would allow the alignment data to become contaminated with gyro drift error. Therefore, it can be seen that a fixture or device is needed with which misalignment of a gyro axis can be measured automatically without having to stop the rate table or without having to add or subtract shims or gauge blocks in a trial and error approach. Rate tables are used to evaluate the performance of rate gyros. The rate table is standard test equipment for all inertial facilities. It consists of a round cylindrical platform (table top) that is rotated about a vertical axis. The speed of the table is precisely controlled by a servo motor (In this application, however, it is not necessary that the speed of the table be precisely known). The operator can control the speed of the table by making manual adjustments with external control knobs.

Therefore, it is an object of this invention to provide a dynamic alignment fixture with feedback control on which a rate gyro can be mounted and a fixture which can be mounted on a rate table for adjustment of the rate gyro relative to the rate table until the gyro output is nulled.

Another object of this invention is to automate the alignment process by providing feedback control which utilizes the output of the gyro as an error signal to drive a nulling jack-screw assembly.

Still another object of this invention is to provide a dynamic alignment fixture with feedback control that will instantaneously seek a null position while the rate table is rotating and without the use of manually operated fixture position drive motors.

Other objects and advantages of this invention will be obvious to those skilled in this art.

SUMMARY OF THE INVENTION

In accordance with this invention, a dynamic alignment fixture with feedback control is provided that includes a base plate that is adapted to be mounted on a rate table and the base plate has a pivot plate pivotably mounted above the base plate at one end by a precision hinge and at the opposite end of the pivot plate a feedback controlled screw jack assembly mounted on the base plate supports the pivot plate for adjustment about the pivot axis, and a resolution displacement gauge is mounted on the pivot plate to indicate the amount on the same end as the automatically controlled jack screw assembly.

DESCRIPTION OF THE PREFERRED EMBODIMENT

Figure 1:
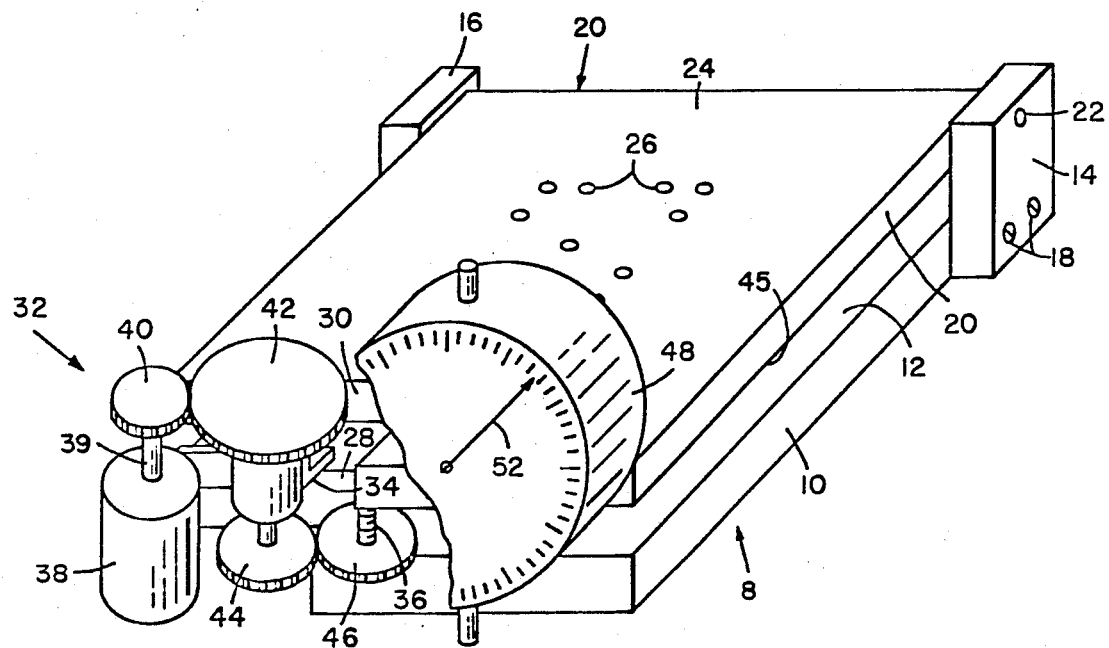
FIG. 1 is a perspective view with portions cut-away and illustrating the dynamic alignment fixture with feedback control in accordance with this invention.
Figure 2:
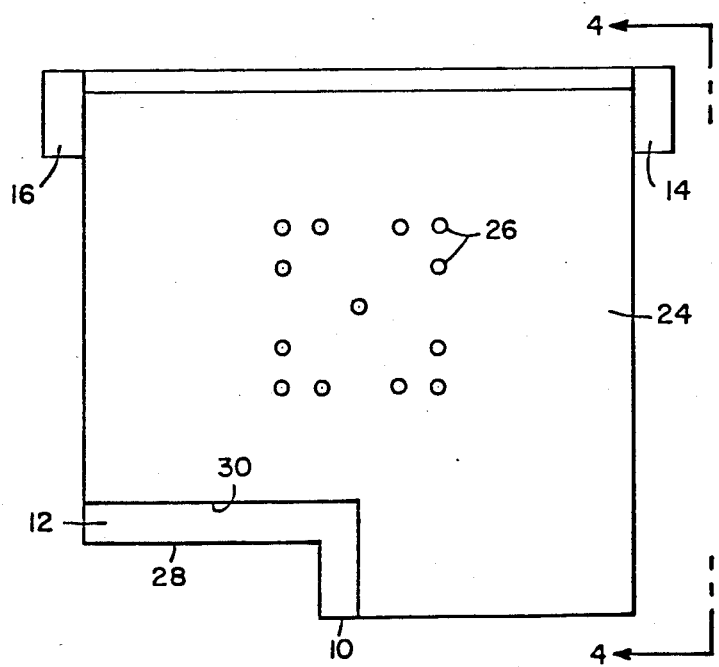
FIG. 2 is a top view of the base plate with the pivot plate pivoted thereon.
Figure 3:
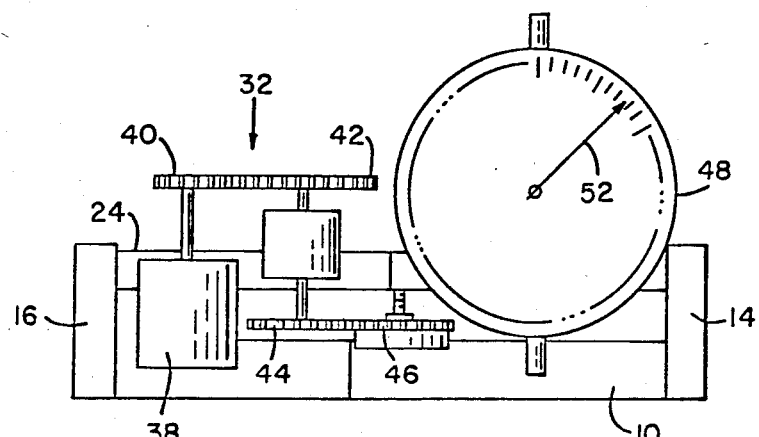
FIG. 3 is a front elevational view of the alignment fixture in accordance with this invention.
Figure 4:
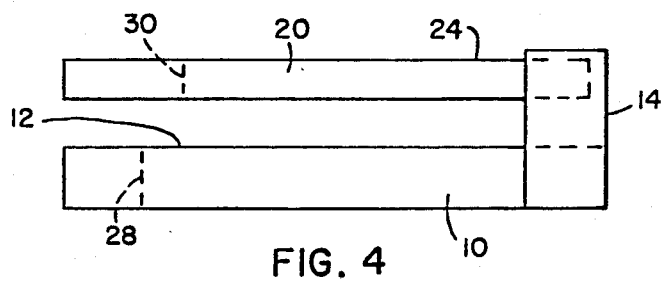
FIG. 4 is a view along line 4—4 of FIG. 2.

Referring now to the drawings, a closed loop dynamic alignment fixture 8 in accordance with this invention includes a base plate 10 having a pair of pivot support members 14 and 16 secured thereto on the opposite sides thereof by screws 18 or the like, as illustrated in FIG. 1. A pivot plate 20 is mounted above base plate 10 at one end by a precision hinge 22. Pivot plate 20 has a flat upper surface 24 with openings 26 therein for mounting of a rate gyro 25 (FIG. 6) thereon. Base plate 10 has a notched-out portion 28 at one end and pivot plate 20 has a lightly larger notched-out area 30 (FIG. 2). A jack-screw assembly 32 is secured to base plate 10 in a conventional manner such as by bracket means 34.

Figure 5:
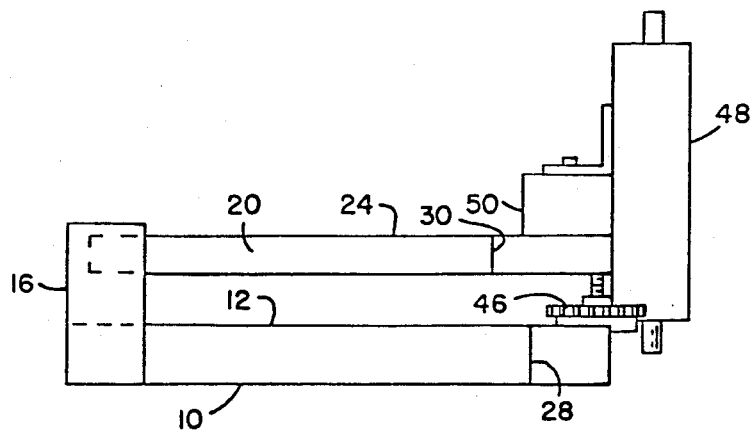
FIG. 5 is a side elevational view of the device as shown in FIG. 3 with the servo motor and associated gears deleted for clarity.

The jack-screw assembly includes a screw 36 secured to a gear 46 and engages the lower surface 45 of plate 20 for support thereof. Bracket 34 supports a servo motor 38 having a shaft 39 provided with a gear 40 on the end thereof. Also a pair of gears 42 and 44 are supported by bracket 34 on upper plate 20. The servo motor 38 can be driven in opposite directions through gears 40, 42, 44 and 46 and is used to move screw 36 up and down to adjust pivot plate 20 about pivot 22 for adjusting the pivot plate relative to base plate 10. A 0.0001 inch resolution displacement gauge 48 is mounted by bracket means 50 (see FIG. 5) to pivot plate 20. Displacement gauge 48 has an indicator 52 for indicating the position of pivot plate 20 relative to base plate 10.

Figure 6:
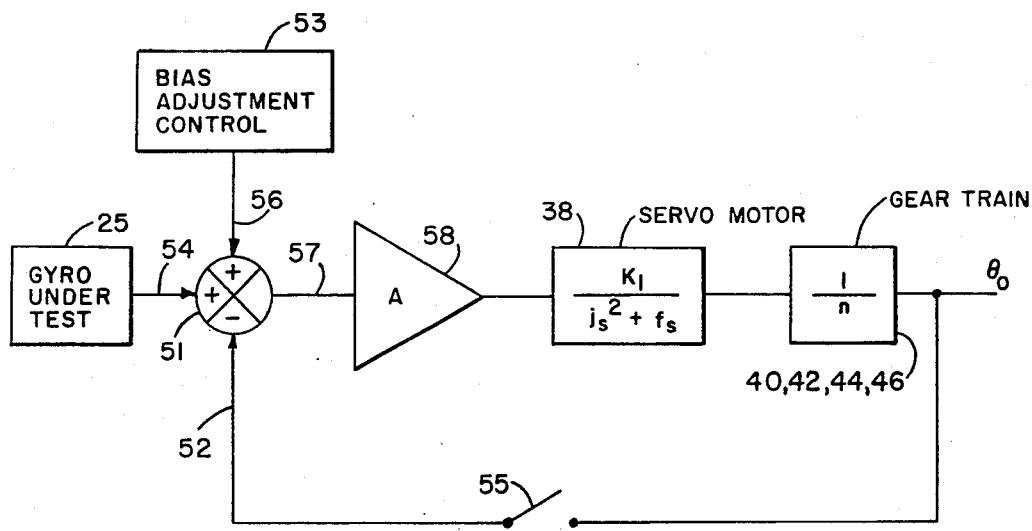
FIG. 6 is a schematic illustrating the measurements that are used to calculate the amount of pivoting of the pivot plate relative to the base plate.

In FIG. 6 the term $K_1/(j_s^2+f_s)$, in block 38 represents the motor transfer function (the ratio between the output from the servo motor in terms of the rotor position with respect to the input in terms of control phase voltage).

j is the rotor inertia term. f is the viscous damping parameter and K is the proportionality constant between stall torque and input voltage to the control field. s is the differential operator representing d/dt.

The term, $1/n$, is made up of gears 40, 42, 44, and 46 where n is the gear ratio. The angle the gear turns through is equal to the inverse of the gear ratio. When a number of gears are coupled together, the angle the gear train turns through is the product of the inverses of the gear rations. Thus $$1/n = (1/n_1)(1/n_2)(1/n_3)(1/n_4)$$

where $n_1$ is associated with gear 40

$n_2$ is associated with gear 42
$n_3$ is associated with gear 44
$n_4$ is associated with gear 46
$\theta_o$ is the misalignment angle.

In operation, when it is desired to test for the amount of misalignment of an input axis to a gyro, the gyro is connected to or fastened on pivot plate 20 at openings 26 in a conventional manner. The dynamic alignment fixture is then mounted on a rate table in a conventional manner. With the dynamic alignment fixture mounted on the rate table, base plate 10 and pivot plate 20 are adjusted to be parallel. This is done by adjusting screw 36 using servo motor 38 to place base plate 10 and pivot plate 20 in a parallel position. With this accomplished, the displacement reading on indicator 48 is noted and recorded. While the rate table is stationary, an output from the gyro under test is noted and recorded. A voltage equal to this output is positively fed into summer 51 (see FIG. 6) from a bias adjustment control 53. The bias adjustment control 53 is nothing more than a variable dc voltage source. The sensitive axis of the gyro under test 25 should be nominally orthogonal to the spin axis of the rate table and pivot axis 22 of pivot plate 20, and the bias associated with the gyro under test 25 will be removed and will not contaminate the test results. Switch 55 is closed and the rate table is set in motion. The output 54 of the gyro under test 25 is summed with the output 56 of the bias adjustment control 53 and the pivot plate 20 angular position indicator 52. Any misalignment of the gyro will produce a change in output of the gyro when the table is up to speed and cause the pivot plate 20 to be driven to a new angular position, automatically. The error signal 57 coming from the summer is amplified by amplifier 58 and used to excite servo motor 38. Servo motor 38 drives gear train 40, 42, 44 and 46 which moves pivot plate 20 up or down to null out error signal 57. Once the error signal 57 is nulled out (as indicated by lack of movement of indicator 52), switch 55 is opened. The rate table is then stopped and the reading of displacement indicator 48 is read and recorded. The angle of misalignment in one coordinate can then be determined by geometric analysis by using the equation:

$$\theta = \mathrm{TAN}^{-1} \frac{\Delta Y}{X}$$

where,
$\Delta y$ is the difference between the initial and final reading of displacement indicator 48 and
x is the distance from the pivot axis 22 of pivot plate 20 to the displacement indicator probe 60.

The previous method of misalignment measurement involved placing shims under one end of the gyro to adjust its position and then measuring the output thereof as it is rotated on the rate table. This trial-and-error approach necessitates stopping the rate table to add or subtract shims, and is valid for low-drift rate gyros only. As the drift rate of the gyro is increased, the time to change the angles and make the trial and error evaluations becomes more critical. A version related to the apparatus of this invention is disclosed in the patent to Troy L. Hester et al entitled "Dynamic Alignment Fixture", U.S. Pat. No. 4,547,974, issued Oct. 22, 1985 and utilizes a motor which can be used to adjust plates up or down applying a switching arrangement to change the direction of current flowing through the motor windings. While this method is a significant improvement over the previous method of using shims in a trial-and-error arrangement, it does suffer some from not being completely automated. The additional time that is required to conduct the test allows the alignment data to become contaminated by gyro drift errors. The apparatus of the present invention overcomes this by automatically aligning itself almost instantaneously before gyro drift errors can occur. This approach eliminates the need for stopping the rate table and this greatly decreases the time between trials, improves accuracy and virtually eliminates errors associated with gyro drift. The fully automated dynamic alignment fixture according to this invention allows misalignment data to be gathered on very high drift rate gyros (i.e. low accuracy gyros) where the shim method or the simi-automatic motor driven method is not feasible. Also, the fixture in accordance with this invention can automatically induce an angle to the rate gyro under test while the rate table is being operated or rotated.

I claim:

1. A dynamic alignment fixture for automatically measuring the input axis of a gyro comprising:
   a. a base plate adapted to be mounted on a rate table said base plate having first and second ends;
   b. an upper plate having first and second ends, said upper plate having said first end pivotally mounted at said first end of said base plate, said upper plate positioned above said base plate and disposed for having a gyro mounted thereon;
   c. a resolution displacement gauge mounted on said pivot plate at said second end thereof, said gauge having an indicator for indicating the position of said pivot plate relative to said base plate;
   d. adjusting means mounted adjacent a second end of said base plate for pivoted support of said upper plate; and,
   e. feedback control means for automatically controlling said adjusting means for pivotal movement of said upper plate, said feedback control means disposed for utilizing the output of said gyro as an error signal, responsive to energization of said gyro, to control said upper plate relative to said rate table until the gyro output is nulled.

2. Apparatus as in claim 1 wherein said feedback control means includes a summer connected to said gyro to receive a signal therefrom indicative of the output of said gyro, a bias adjustment control for directing a voltage equal to the output of said gyro, responsive to energization thereof, to said summer, an amplifier connected to said summer to receive an error signal from said summer and for directing said error signal to said adjusting means for adjusting said upper plate up or down for nullification of said error signal.

3. Apparatus as in claim 2 wherein said adjusting means includes a motor driven screw-jack assembly including a servo motor for energization by said feedback control means, a gear train driven by said servo motor and including an output gear disposed for adjustment up and down to raise or lower said upper plate relative to said base plate to cause it to pivot about its pivot mounting at said one end.

4. Apparatus as in claim 3 wherein said base plate and said pivot plate each have notched out portions at said second end thereof and said motor driven screw-jack assembly is mounted at said notched out portions of said upper plate and base plate.

* * * * *